(12) United States Patent
Rankine

(10) Patent No.: US 9,319,745 B2
(45) Date of Patent: Apr. 19, 2016

(54) MEDIA PLAYER SYSTEM FOR PRODUCT PLACEMENTS

(71) Applicant: VidRetal, Inc., Forest Hills, NY (US)

(72) Inventor: Christopher G. Rankine, Forest Hills, NY (US)

(73) Assignee: VIDRETAL, INC., Forest Hills, NY (US)

(*) Notice: Subject to any disclaimer, the term of this patent is extended or adjusted under 35 U.S.C. 154(b) by 0 days.

(21) Appl. No.: 14/516,408

(22) Filed: Oct. 16, 2014

(65) Prior Publication Data

US 2015/0106856 A1    Apr. 16, 2015

Related U.S. Application Data

(60) Provisional application No. 61/891,499, filed on Oct. 16, 2013.

(51) Int. Cl.

| | | |
|---|---|---|
| H04N 7/025 | (2006.01) | |
| H04N 21/4725 | (2011.01) | |
| H04N 21/858 | (2011.01) | |
| H04N 21/488 | (2011.01) | |
| H04N 21/845 | (2011.01) | |
| H04N 21/27 | (2011.01) | |
| H04N 21/2543 | (2011.01) | |
| H04N 21/854 | (2011.01) | |
| H04N 21/222 | (2011.01) | |
| H04N 21/2743 | (2011.01) | |
| H04N 21/25 | (2011.01) | |

(52) U.S. Cl.
CPC ....... *H04N 21/4725* (2013.01); *H04N 21/4886* (2013.01); *H04N 21/8456* (2013.01); *H04N 21/8583* (2013.01); *H04N 21/222* (2013.01); *H04N 21/251* (2013.01); *H04N 21/25435* (2013.01); *H04N 21/27* (2013.01); *H04N 21/2743* (2013.01); *H04N 21/854* (2013.01); *H04N 21/8586* (2013.01)

(58) Field of Classification Search
CPC .............. H04N 21/222; H04N 21/251; H04N 21/25435; H04N 21/27; H04N 21/2743; H04N 21/854; H04N 21/8586
See application file for complete search history.

(56) References Cited

U.S. PATENT DOCUMENTS

| | | | | |
|---|---|---|---|---|
| 5,589,892 A * | 12/1996 | Knee | ....................... | A63F 13/12 348/564 |
| 5,929,849 A * | 7/1999 | Kikinis | .............. | H04N 5/44543 348/E5.002 |
| 6,282,713 B1 * | 8/2001 | Kitsukawa | ............. | G06Q 30/02 348/E5.105 |
| 7,367,042 B1 * | 4/2008 | Dakss et al. | .................... | 725/60 |
| 8,312,486 B1 * | 11/2012 | Briggs et al. | .................... | 725/32 |

(Continued)

*Primary Examiner* — Nicholas Corbo
(74) *Attorney, Agent, or Firm* — Richards Patent Law P.C.

(57) ABSTRACT

A media player system for product placements, including: a controller; a computer-readable non-transitory memory in communication with the controller including instructions that when executed by the controller cause it to: display a user interface including a video frame and a product information area, wherein the product information area is adjacent or overlaps the video frame; display contents of a video in the video frame, wherein the video includes corresponding video metadata; receive a current location of a cursor; and when the current location of the cursor is within a product hotspot, display product information associated with the product hotspot in the product information area, wherein the product hotspot is defined by the video metadata as a location within the video frame, at one or more points in time, that is associated with the product information.

20 Claims, 7 Drawing Sheets

(56) References Cited

U.S. PATENT DOCUMENTS

| | | | | |
|---|---|---|---|---|
| 8,942,549 B2* | 1/2015 | Duffin | G11B 27/322 | 386/349 |
| 2007/0157228 A1* | 7/2007 | Bayer | G06Q 30/02 | 725/34 |
| 2007/0300280 A1* | 12/2007 | Turner | G06Q 30/02 | 725/135 |
| 2008/0239169 A1* | 10/2008 | Moon et al. | | 348/739 |
| 2009/0083815 A1* | 3/2009 | McMaster et al. | | 725/110 |
| 2011/0162002 A1* | 6/2011 | Jones | G06Q 30/02 | 725/32 |
| 2012/0167146 A1* | 6/2012 | Incorvia | | 725/60 |
| 2012/0266197 A1* | 10/2012 | Andrews, II | G06Q 30/02 | 725/60 |
| 2013/0283301 A1* | 10/2013 | Avedissian et al. | | 725/5 |
| 2015/0220535 A1* | 8/2015 | Palmer | G06F 17/3053 | 707/749 |

\* cited by examiner

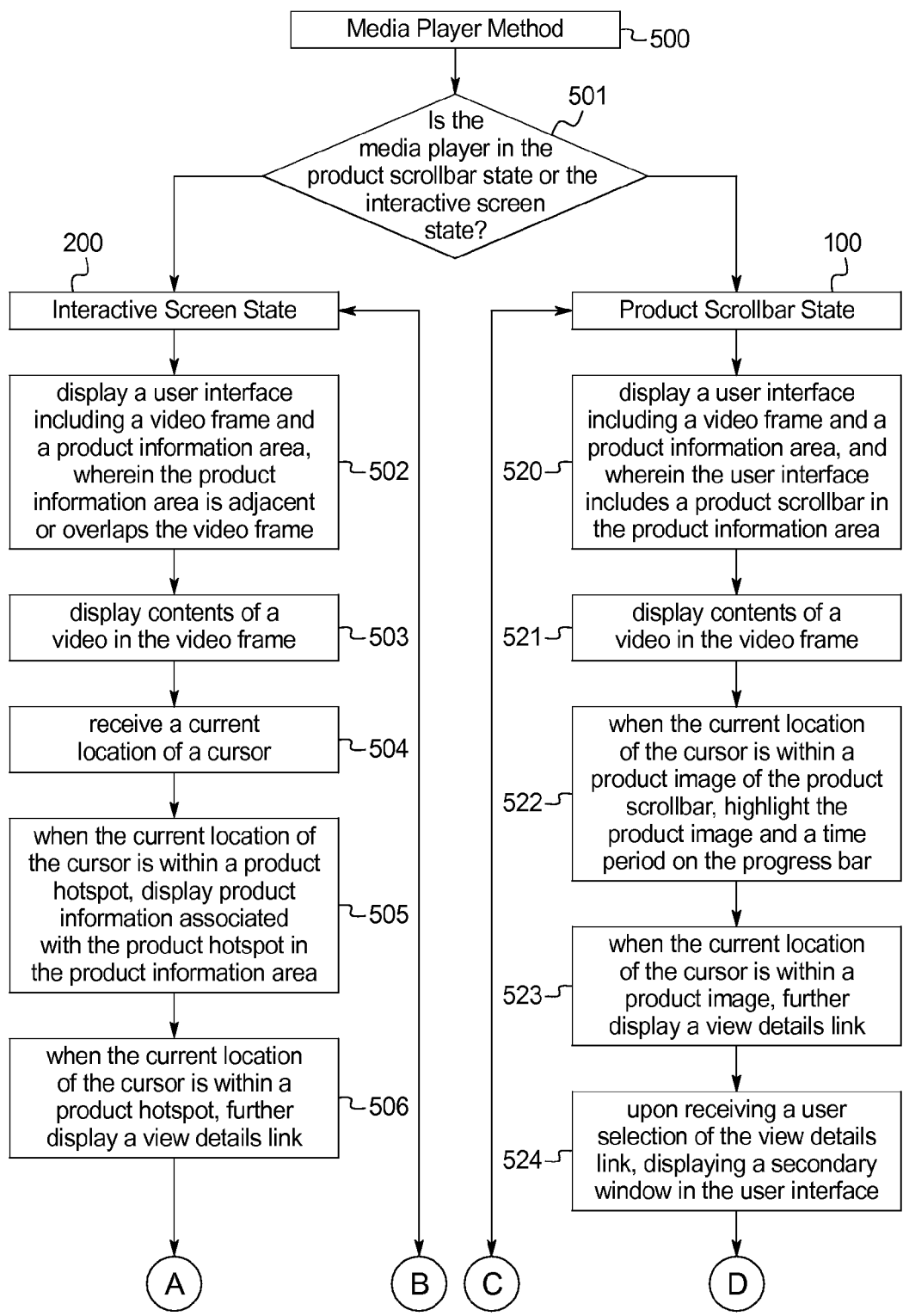

US 9,319,745 B2

MEDIA PLAYER SYSTEM FOR PRODUCT PLACEMENTS

CROSS-REFERENCE TO RELATED APPLICATIONS

This application incorporates by reference and claims the benefit of priority to U.S. Provisional Patent Application No. 61/891,499 filed Oct. 16, 2013.

BACKGROUND OF THE INVENTION

The present subject matter relates generally to systems and methods for providing users with product information on products featured in video content, such as product placements. More specifically, the present invention relates to systems and methods for providing users product information during the viewing of video content by providing user interface elements that permit a user to easily identify integrated products and access further information about the products.

Product placement is an increasingly preferred approach to introduce customers to products in a more natural, low-pressure context than more explicit advertising. For that reason, product placement has become prevalent in commercial television programming and video content. However, television and movie viewers often lack an ability to learn information about the products integrated into the programming ("integrated products"). It would be ideal to provide information about integrated products to consumers while their interest is piqued.

Previous media players including product placements were generally developed primarily as content monetization solutions based on a cost-per-click model. Those media players often required a user to register product hotspot requests by a mouse click before any product information is displayed. These media players required users to discover product placements by trial-and-error by clicking on products in the video to determine whether integrated product data is present. Further, previous media players included a method of content indexing and linking to product information that restricted a user's ability to locate products wherever they appear in video and disrupted the user's viewing enjoyment.

Further, previous media players have poorly balanced the tradeoff between providing easy-to-access product information on integrated products and providing an enjoyable user interface for video content consumption. For example, previous media players provided mechanisms for passive discovery of integrated content, such as clickable hotspots, but lacked mechanisms for active discovery and browsing of integrated content. Additionally, where a user was aware of an integrated product, previous media players provided no mechanism to find the appropriate time frames in which the product appeared. Moreover, when a user wanted to search a particular scene for product hotspots, pausing the video was often required to prevent the integrated product from moving out of the video frame. Further, previous media players often would not include product browsing functions in full screen mode, and often would only provide limited product information lacking in additional product images and product information.

Accordingly, there is a need for systems and methods for providing users with product information during the viewing of video content by providing user interface elements that permit a user to easily identify integrated products and access further information about the products, as described herein.

BRIEF SUMMARY OF THE INVENTION

To meet the needs described above and others, the present disclosure provides media player systems and methods including multiple user interface states for providing users product information during the viewing of video content. The media player system additionally provides user interface elements that permit a user to easily identify and access further information about the products integrated into the video content as product placements ("integrated products").

A media player system may include a user device including a media player that receives video content from a remote server. The user device may be a video-enabled device, such as a computer, television, mobile device, etc. The video content may be a video file downloaded or streamed by the user. The video file may include metadata that describes the integrated products. The metadata may include a listing of the video segments containing integrated products, the location of the integrated products within various video frames, product descriptions, hyperlinks related to the integrated products, etc.

The media player may be provided as a desktop application, mobile application, television application, plug-in, web application, etc. In an embodiment, the video player system may be a flash video application stored in the memory of a user device.

The media player includes two different interactive user interface states: the product scrollbar state, and the interactive screen state. Both the product scrollbar state and the interactive screen state allow the user to interact with integrated content. However, the interactive screen state is designed to emphasize the video content and deemphasize the integrated product content, while the product scrollbar state is designed to emphasize the integrated product content. The user may be permitted to toggle between the two interactive user interface states.

More specifically, the interactive screen state is designed to allow passive discovery of integrated content by showing integrated product information when a cursor hovers over a product hotspot in the video. In some embodiments, the product hotspot is the integrated product itself, for example, where the integrated product is a fashion dress, the product hotspot may be the image of the dress in the video frame of the video content. In other embodiments, such as examples where the product is a service, the product hotspot may be a physical representation of the service; for example, the product hotspot for medical services may be the image of a hospital in the video frame of the video content.

Conversely, the product scrollbar state is designed to allow active discovery of integrated products. During video playback in the product scrollbar state, a product scrollbar is present on the screen. In a preferred embodiment, the media player displays static product images in a product information area at the bottom of the media player for each of the integrated products and services that appear in the video content. When the user hovers over or clicks a product image, time frames on the video's progress bar may be highlighted indicating where the integrated product appears in the video content. Similarly, when a user clicks a static product image, the time frames in which the product appears in the video may be highlighted in the video's progress bar, and further, the playhead may automatically be brought to the time frame an appearance of the integrated product selected by the user.

The different user interface states allow users to interact with information about the integrated products in a state having minimal distractions (the interactive screen state), or to actively view the integrated product content (the product scrollbar state).

In one use case, the user may start by viewing video content in the interactive screen state and after hovering the cursor over a product of interest may discover that there is associated product information. The user, perhaps out of curiosity, may then choose to switch states to more actively engage integrated products in the product scrollbar state. Thus, the user may discover integrated products in the interactive screen mode with minimal distraction while still permitting opportunities to discover integrated products to the satisfaction of advertisers.

In another use case, the media player may be used to highlight a product featured in popular media (often noted with the phrase "As seen in . . . ."). For example, a user may be browsing a product description on a product website. The product website may include an embedded media player of the present disclosure so that the user may view popular video content featuring the product. The progress bar of the media player may be highlighted with time frames where the product is featured in the video content. The media player may be embedded in interactive screen state to emphasize the video content, or may be embedded in the product scrollbar state to permit discovery of other integrated products or to emphasize commonality with other products.

Both the product scrollbar and interactive screen states may work in a standard windowed screen and also in full screen mode. Integrated products viewed by the user may be saved to a wish list or purchased by placing them in a shopping cart. Additionally, integrated products may also be shared to social networking sites, such as those provided under the trademarks Facebook®, Pinterest®, etc.

Detailed product information may appear in a popup window when either the user clicks the static product image or the user clicks the product detail link that may be displayed at the bottom of the static product image when the user hovers over the static product image. Additionally, video time frames in which the product appears in the video content may be accessible by user interaction with the static product images. When the user moves the cursor over the static product image, time frames on the video progress bar may be highlighted to show the video segments where the integrated product appears in the video content. The video progress bar may remain lit with time frames after the static product image is clicked or otherwise triggered. A product name label may popup over the static product image in the product scrollbar state and may popup over the product hotspot within the video frame of the interactive video screen when the cursor hovers over the static product image or the product hotspot.

In the product scrollbar state, the media player includes various elements to control the functionality of the media player. As a first example, the media player may include a video frame in which the media player displays the playback of video content. Additionally, the media player may include the product scrollbar that displays the integrated products shown in the video content. When a cursor hovers over the static product image in the product scrollbar, a product popup label may popup to display a product name.

The product scrollbar state may additionally include an auto-advance feature. The auto-advance feature is an additional mechanism for active discovery. When present, the auto-advance feature displays each group of static products in the product scrollbar for an approximately equal amount of time regardless of screen time. The auto-advance feature is intended to show each product or service to the satisfaction of Advertisers, and ensures that users are aware that there are additional integrated products besides the set of products initially displayed upon loading video content.

In an interactive screen state, invisible product hotspots track the integrated products within the video playback. When the user's cursor hovers over a product hotspot, brief product information related to the integrated product will display in the product information area. In an embodiment, the brief product information may be displayed in the same screen real estate at the bottom of the player used by the product scrollbar in the product scrollbar state. Detailed product information displayed in a popup window may be accessed via a product detail popup link within the product information area.

During playback in the interactive screen state, in some embodiments, product hotspots may be discoverable only by hovering the cursor over the product hotspot. In the interactive screen state, a user who is not manipulating the cursor may enjoy the video content without being distracted by unwanted product information. In other embodiments, an unobtrusive prompt, such as a small icon, may be used to indicate the presence of integrated products in the video content.

Like the product scrollbar state, the interactive screen state includes various user interface elements that control the functionality of the media player system. As a first example, the media player in the interactive screen state may include an interactive video frame that displays the playback of video with product hotspots. Brief product information appears at the bottom of the player when mouse hovers over the product hotspot.

The media player may include further controls present in both the product scrollbar state and the interactive screen state. As an example, the media player may include a progress bar to indicate the progress of the video content and to indicate various video segment time frames in which integrated products appear in the video content. Additionally, the media player may further include a product detail popup link that may be selected by a user to invoke a popup window to display a product description, attributes, and additional product images. Further, a full screen button may be included on the media player to toggle between a standard mode and full screen mode.

Moreover, the media player may include an interactive settings button to access a settings menu that may include checkboxes to enable or disable the product popup label, or to enable a "pause video on screen rollover" playback mode such that playback pauses when the mouse hovers over the video frame or the product information area and resumes playback when the mouse rolls off the video frame or the product information area. As noted, the user may toggle between the interactive screen and product scrollbar states. The toggling may be accomplished by, for example, clicking an icon button on the media player or a mouse right-click menu, by pressing a keyboard key, such as the tab key, or may be accomplished by any other predetermined user input. The media player may include optional interactive settings to enhance the user's browsing experience. For example, in the interactive screen state, the media player may include the previously described "pause video on screen rollover" functionality that pauses playback when the cursor hovers within the video frame or the product information area. This feature gives the user an opportunity to browse integrated products without having to miss a moment of the video. Playback resumes as soon as the cursor hovers off the video. As another example, the media player may include "display product name on hotspot rollover" functionality that displays a popup label with the product name when the user's mouse hovers over a product hotspot.

For web novices, the user interface of the product scrollbar state provides these users with a quick and simple method to view integrated product information and locate the associated video time frames in which the products appear. Further, the product scrollbar state gives users the ability to locate products anywhere they are showcased throughout the video by the associated highlighted timeframes or by clicking the product image which triggers the playhead to show the user an instance where the product appears in the video.

In an embodiment, a media player system for product placements includes: a controller; a computer-readable non-transitory memory in communication with the controller including instructions that when executed by the controller cause it to: display a user interface including a video frame and a product information area, wherein the product information area is adjacent or overlaps the video frame; display contents of a video in the video frame, wherein the video includes corresponding video metadata; receive a current location of a cursor; and when the current location of the cursor is within a product hotspot, display product information associated with the product hotspot in the product information area, wherein the product hotspot is defined by the video metadata as a location within the video frame, at one or more points in time, that is associated with the product information.

In some embodiments, the product information includes an image associated with the product, a product name, and a product description. Additionally, in some embodiments, the memory further includes instructions that when executed by the controller cause it to: when the current location of the cursor is within a product hotspot, further display a view details link; and upon receiving a user selection of the view details link, displaying a secondary window in the user interface, wherein the secondary window includes an image associated with the product, a product name, and a product description. Further, in some embodiments, the memory further includes instructions that when executed by the controller cause it to: when the current location of the cursor is within the video frame, pause the display of the contents of the video.

In some embodiments, the memory further includes instructions that when executed by the controller cause it to: receive an input indicating a desire to enter a second user interface state, and when the system is in the second user interface state, display a product scrollbar in the product information area, wherein a product scrollbar includes one or more product images specified by the video metadata. Additionally, in some embodiments, the user interface includes a progress bar and the memory further includes instructions that when executed by the controller causes it to: when the current location of the cursor is within a product image of the product scrollbar, highlight the product image and a time period on the progress bar. Further, in some embodiments, the memory further includes instructions that when executed by the controller cause it to: in response to a user input associated with one of the product images, update the current playback location to a playback location defined by the video metadata as corresponding to an appearance of the product depicted in the one of the product images. Even further, in some embodiments, the memory further includes instructions that when executed by the controller cause it to: in response to a second user input associated with one of the product images, update the current playback location to a second playback location defined by the video metadata as corresponding to a second appearance of the product depicted in the one of the product images.

In some embodiments, the memory further includes instructions that when executed by the controller cause it to: upon receiving a user input associated with one of the product images and before updating the current playback location, storing the current playback location; and upon receiving an input indicating a desire to return to playback from the stored current playback location, updating playback to the stored current playback location. Additionally, in some embodiments, the memory further includes instructions that when executed by the controller cause it to: identify a set of product images not yet displayed in the product scrollbar, updating the product scrollbar to display one or more product images of the undisplayed set.

In an embodiment, a media player method for product placements for execution by a controller that cause it to: display, by the controller, a user interface including a video frame and a product information area, wherein the product information area is adjacent or overlaps the video frame; display, by the controller, contents of a video in the video frame of the user interface, wherein the video includes corresponding video metadata; receive, by the controller, a current location of a cursor; and when the current location of the cursor is within a product hotspot, display, by the controller, product information associated with the product hotspot in the product information area, wherein the product hotspot is defined by the video metadata as a location within the video frame, at one or more points in time, that is associated with the product information.

In some embodiments, the product information includes an image associated with the product, a product name, and a product description.

In some embodiments, the method further includes: when the current location of the cursor is within a product hotspot, further display, by the controller, a view details link; and upon receiving a user selection of the view details link, display, by the controller, a secondary window in the user interface, wherein the secondary window includes an image associated with the product, a product name, and a product description.

Moreover, in some embodiments, the method further includes: when the current location of the cursor is within the video frame, pause, by the controller, the display of the contents of the video.

In some embodiments, the method further includes: receive, by the controller, an input indicating a desire to enter a second user interface state, and when the system is in the second user interface state, display on the user interface, by the controller, a product scrollbar in the product information area, wherein a product scrollbar includes one or more product images specified by the video metadata. Additionally, in some embodiments, the method further includes: when the current location of the cursor is within a product image of the product scrollbar, highlight, by the controller, the product image and a time period on the progress bar. Moreover, in some embodiments, the method further includes: in response to a user input associated with one of the product images, update the current playback location to a playback location defined by the video metadata as corresponding to an appearance of the product depicted in the one of the product images. Further, in some embodiments, the method further includes: in response to a second user input associated with one of the product images, update the current playback location to a second playback location defined by the video metadata as corresponding to a second appearance of the product depicted in the one of the product images.

In an embodiment, a media player system for product placements includes: a controller; and a computer-readable non-transitory memory in communication with the controller including instructions that when executed by the controller cause it to: display a user interface including a video frame and a product information area, wherein the product information area is adjacent or overlaps the video frame, and the product information area includes a product scrollbar including one or more product images specified by the video metadata; display contents of a video in the video frame, wherein the video includes corresponding video metadata; in response to a user input associated with one of the product images, store the current playback location and update the current playback location to a playback location defined by the video metadata as corresponding to an appearance of the product depicted in the one of the product images; in response to a second user input associated with one of the product images, update the current playback location to a second playback location defined by the video metadata as corresponding to a second appearance of the product depicted in the one of the product images; and upon receiving an input indicating a desire to return to playback from the stored current playback location, updating playback to the stored current playback location.

An object of the invention is to provide a solution to the challenges of providing product placement strategies in video content compatible with the needs of the end user.

An advantage of the invention is that it provides a simple user interface that effectively promotes product placements but does not impede on the user's viewing enjoyment.

An advantage of the invention is that it improves the effectiveness of product placements used in TV & movies by pushing the products & services from the screen directly into the hands of the viewers.

Another advantage of the invention is that it simplifies the process for the user of identifying integrated products in video content. Most importantly, it facilitates the effort performed by users to find vendors on the internet that offer the integrated product for sale.

A further advantage of the invention is that it provides a user interface state oriented towards passive product discovery to permit product discovery without distracting the user from content consumption.

Yet another advantage of the invention is that it provides a user interface state oriented towards active productive discovery to allow the user to actively discover integrated product information.

Another advantage of the invention is that it provides a mechanism to toggle between an active product discovery user interface state and a passive content-oriented product discovery.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 5*a* and 5*b* illustrate an example of a media player method of the present disclosure.

DETAILED DESCRIPTION OF THE INVENTION

Figure 1:
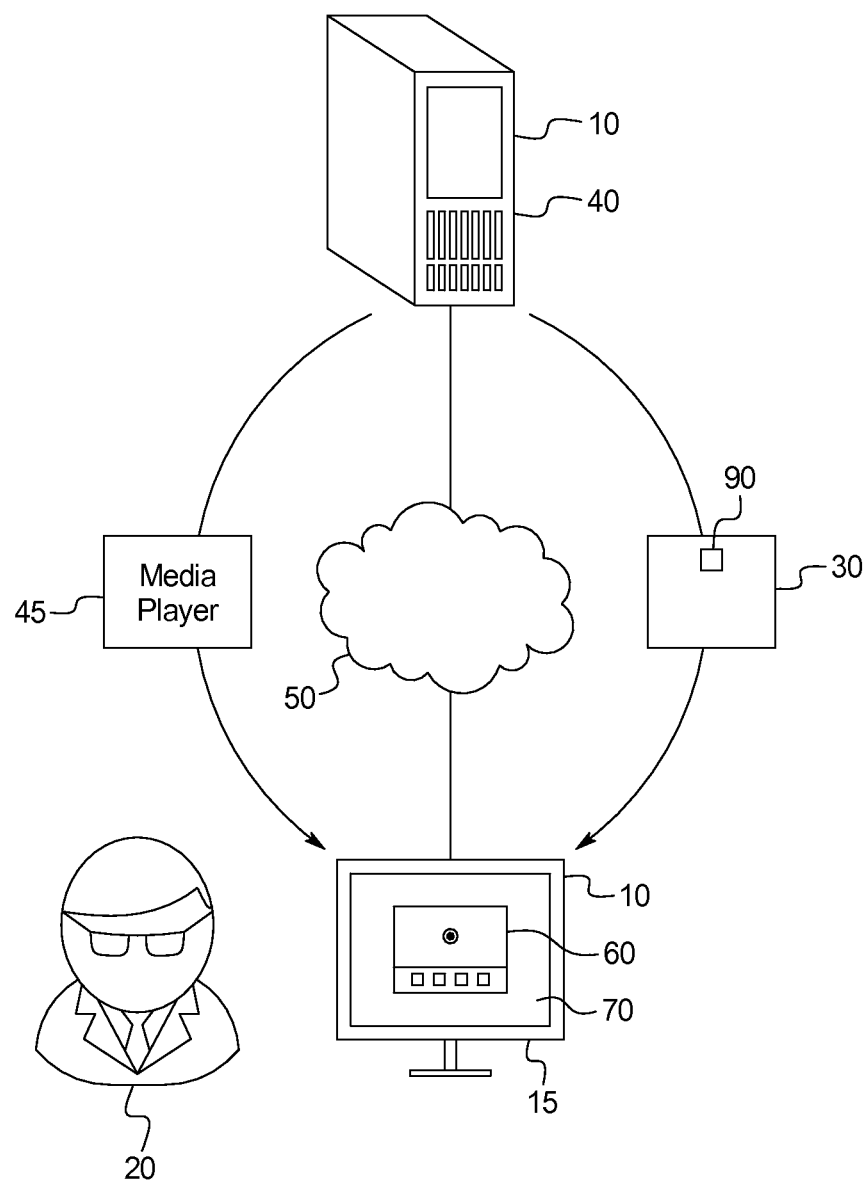
FIG. 1 illustrates the ecosystem of an example of a media player system of the present disclosure.

FIG. 1 illustrates an example of the ecosystem of a media player system 10. As shown in FIG. 1, the media player system 10 permits a user 20 to download or stream video content 30 from a remote media server 40 over a network 50, such as the Internet. During playback, the user 20 may view the video content 30 along with integrated product placements ("integrated products 80"). Information on the integrated products 80 may be called out in user interface 70 to permit the user 20 to easily identify the integrated products 80 and access further information about the integrated products 80. Integrated products 80 may frequently include clothing, jewelry, makeup, food products, etc., but may generically include any tangible or intangible products and services.

In an embodiment, the media player system 10 may be a user device, such as a personal computer, television, tablet, mobile device, etc, running a media player 60 that executes the media player method 500 (FIGS. 5*a* and 5*b*) and/or otherwise embodies the functionality described herein. The media player 60 may include multiple user interface states, as will be described with respect to the examples in FIGS. 2 and 3. The user interface states provide for a differing presentation of product information during the viewing of video content 30.

Figure 6:
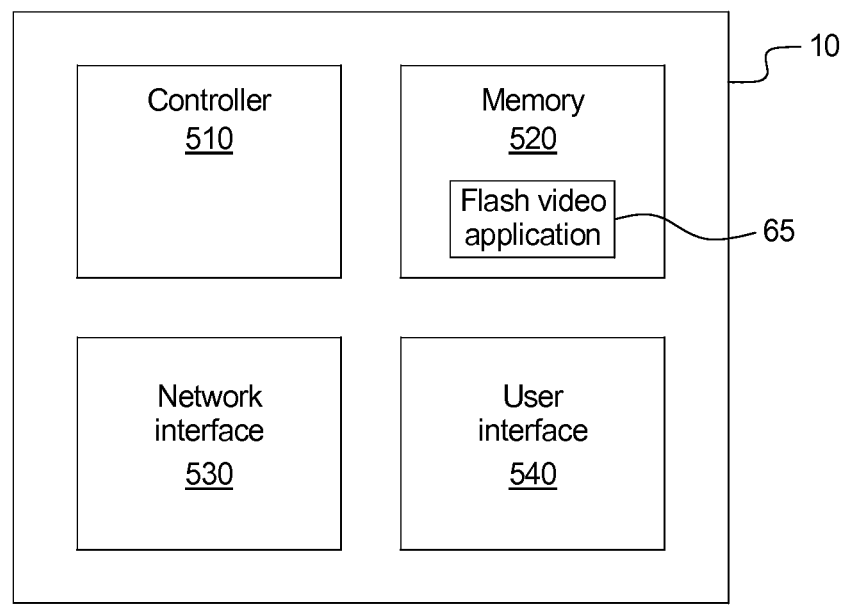
FIG. 6 illustrates the logical components of the media player system of FIG. 1.

The media player 60 of the media player system 10 may be provided as a desktop application, mobile application, television application, plug-in, web application, etc. In an embodiment, the media player 60 is a flash video application 65 that can utilize an ACTIONSCRIPT class file to execute dynamic functionality. For example, in an embodiment, the media player system 10 may be a personal computer of a user 20 that has received a flash video application 65 defining the media player 60 from the media server 40. The media player system 10 may execute the flash video application 65 to permit the user 20 to view the video content 30. In other embodiments, the media player system 10 may be a remote media server 40 for streaming video content 30 to user devices, such that the video content 30 may be viewed as described herein. The media server 40 may provide the media player 60 to a user device 15 in the form of executable media player instructions 45, such as a flash video application 65 (FIG. 6).

The video content 30 may include metadata 90 that describes the integrated products 80. The metadata 90 may include a listing of video segments containing integrated products 80, the location of the integrated products 80 within various still frames of the video content 30 and associated product hotspots 220 (FIG. 3), product descriptions, hyperlinks related to the integrated products 80, and other information to carry out the functionality described herein.

Figure 2:
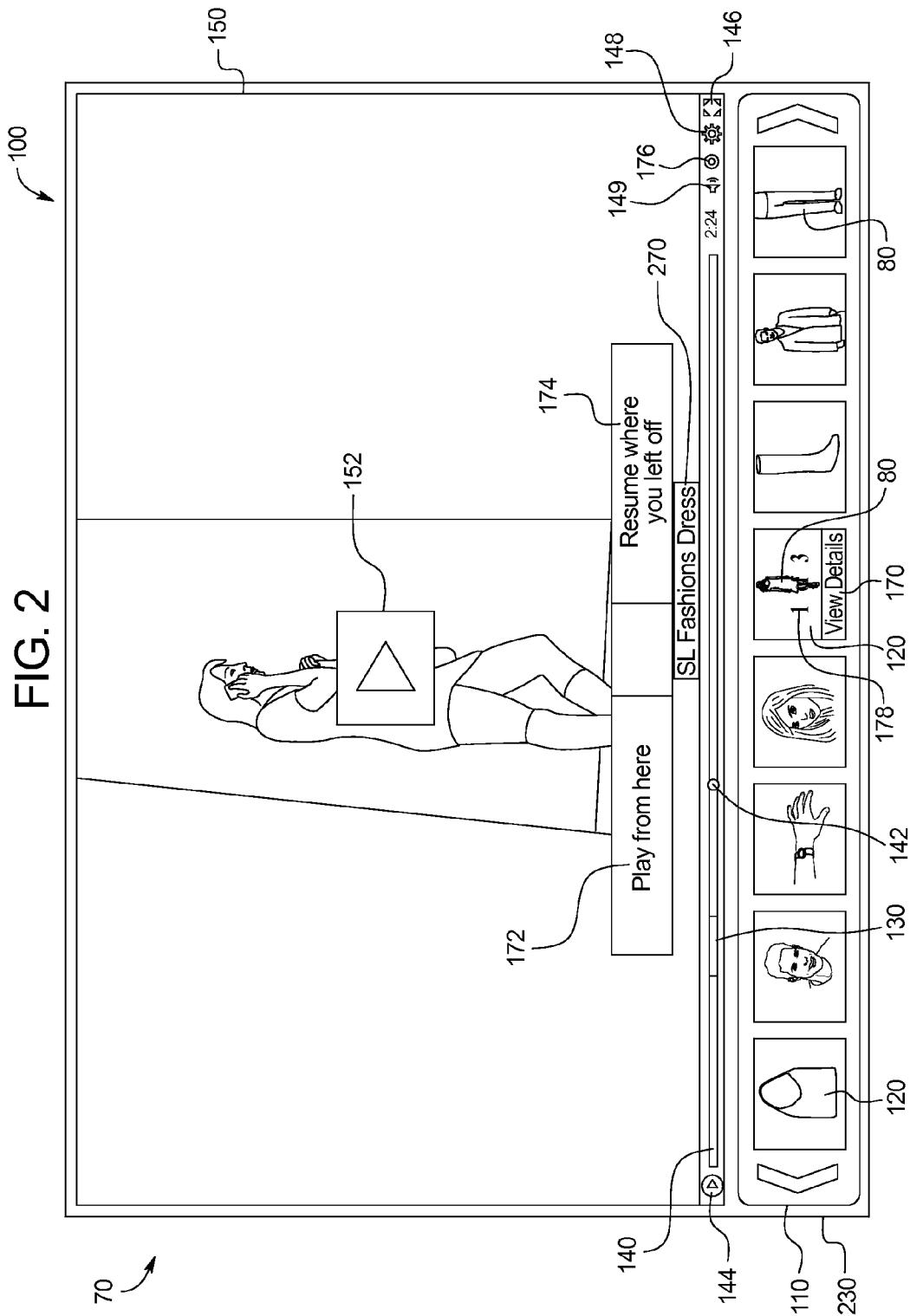
FIG. 2 illustrates an example of the media player user interface of the media players system in a product scrollbar state.
Figure 3:
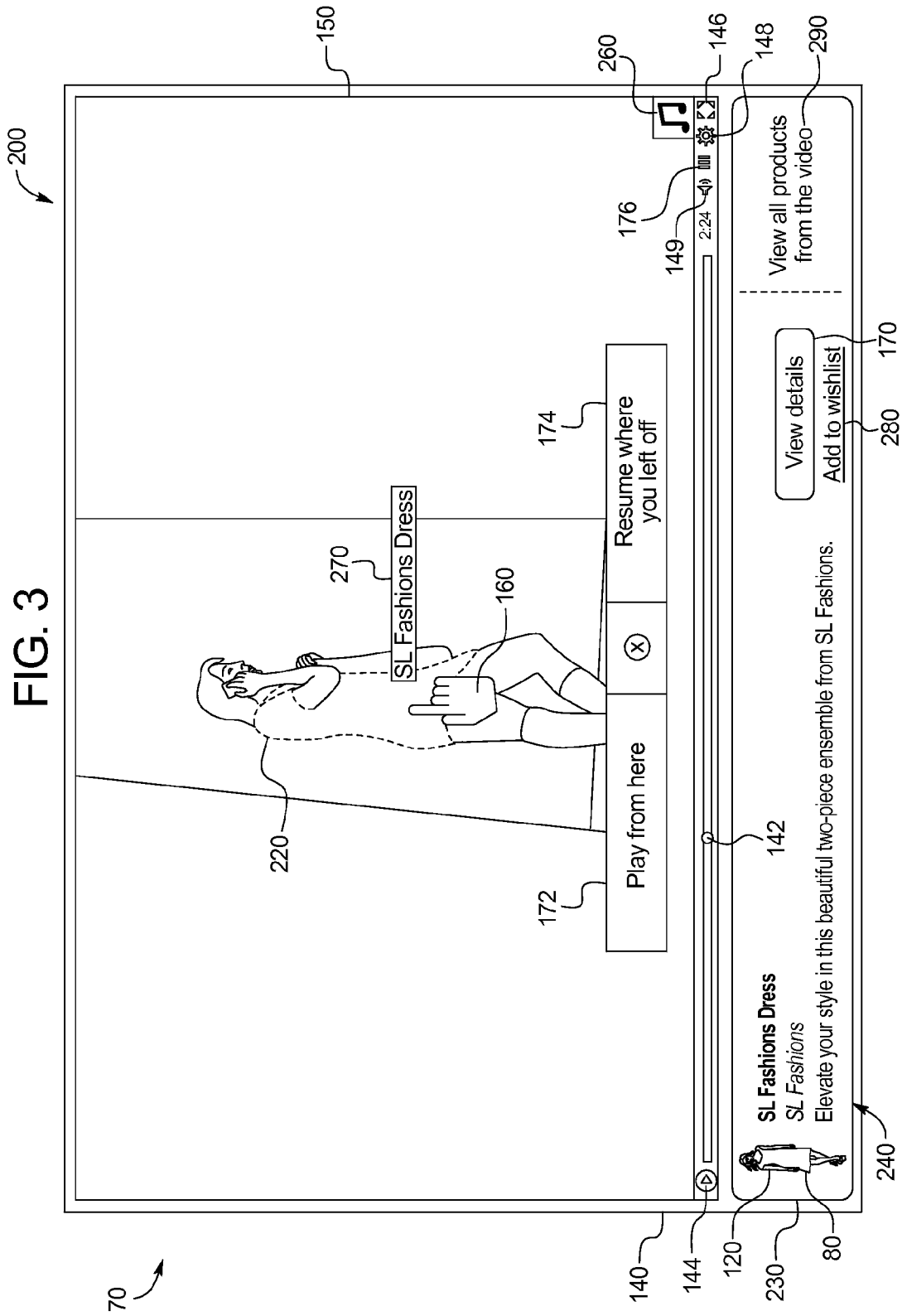
FIG. 3 illustrates an example of the media player user interface of the media player system in an interactive screen state.

As noted, the media player 60 may include two or more different interactive user interface states, such as: a product scrollbar state 100 (FIG. 2), and an interactive screen state 200 (FIG. 3). Both the product scrollbar state 100 and the interactive screen state 200 include a video frame 150 for displaying the video content 30 and a product information area 230. And both user interface states allow the user 20 to interact with integrated products 80. However, the interactive screen state 200 is designed to emphasize the video content 30 and deemphasize the integrated products 80, while the product scrollbar state 100 is designed to emphasize the integrated products 80. In an embodiment, the user 20 may toggle between the various user interface states.

Both the product scrollbar state 100 and interactive screen state 200 may work in standard screen and full screen modes. For example, in standard screen mode, the media player 60 may be embedded in a web page as a flash video application 65 and may be sized like other web-based flash video. In an embodiment, the user 20 may toggle between the standard screen and full screen modes.

As shown in FIG. 2, the product scrollbar state 100 is designed to allow active discovery of integrated products 80. The media player 60 may include a standard video frame 150 that displays the playback of video content 30. The media player 60 may include standard video playback features such as a progress bar 140, a playback button 144, a fullscreen toggle button 146, a volume button 149, etc. The playback button 144 may be clicked to start and stop playback. The user 20 may click the full screen toggle button 146 to toggle the media player 60 between standard screen and full screen modes. The volume button 149 may trigger the display of a slider that may set the current volume.

While in the product scrollbar state 100, a product scrollbar 110 is present on the user interface 70 in a product information area 230. In a preferred embodiment, the media player 60 displays static product images 120 in the product scrollbar 110 at the bottom of the media player 60 of all the integrated products 80 and services that appear in the video content 30.

The media player 60 may include various controls to control viewing of the integrated products 80 in the video content 30. For example, when the user 20 hovers the cursor 160 over, or clicks, a product image 120, time frames 130 on the progress bar 140 of the video content 30 may be highlighted to indicate time frames 130 during which the integrated product 80 appears in the video content 30. Additionally, a product name label 270 may popup over the product image 120 in the product scrollbar state 100. (To disable the product name label 270, the media player 60 may include an interactive settings button 148 that opens an interactive settings menu including a checkboxes to enable or disable the product name label 270.) Further, while in the product scrollbar state 100, the user 20 may click anywhere in the video frame 150 to pause the playback. Once pause, a play/pause toggle button 152 may be displayed within the video frame 150. The user 20 may then click anywhere in the video frame 150 to resume playback. Pause functionality may be disabled when the post-product browsing options (described below) are active.

Similarly, when a user 20 clicks a product image 120, the time frames 130 in which the integrated product 80 appears in the video content 30 may be highlighted in the progress bar 140, and further, video playback may be paused and the playhead 142 may be automatically brought to the time frame 130 of an appearance of the integrated product 80 selected by the user 20. The progress bar 140 may remain lit with time frames 130 after the static product image 120 is clicked or otherwise triggered. Subsequent clicks on the product image 120 may bring the playhead 142 to the next sequential time frame 130 in which the product appears. Video scene numbers 178, such as "1 of 3" may be displayed over the static product image 120 to indicate which current appearance of a total number of appearances of the integrated product 80 has been triggered. Additionally, a product details link 170 may be displayed on or near the static product image 120. When clicked, the product details link 170 may trigger the display of a popup window 400.

Some video content 30 may contain more integrated products 80 than may be displayed in the product scrollbar 110 at a given time. Accordingly, the product scrollbar state 100 may additionally include an auto-advance feature. The auto-advance feature provides an additional mechanism for active discovery. When present, the auto-advance feature displays each group of integrated products 80 in the product scrollbar 110 for an approximately equal amount of time regardless of screen time in the video content 30. The auto-advance feature is intended to show each integrated product 80 or service to the satisfaction of advertisers, and ensures that users 20 are aware that there are additional integrated products 80 besides the set of products initially displayed upon loading of the product scrollbar 110. The auto-advance feature may keep track of the static product images 120 of the integrated products 80 that have not been seen by the user 20, and may periodically display a new set of never-before-seen static product images 120. The auto-advance feature will calculate the display time for the never-before-seen static product images 120 based on the remaining playtime of the video content 30.

The media player 60 may further include post-product browsing playback options that permit the user 20 easy entry back into the video content 30. When the user 20 clicks a static product image 120, playback is paused and the playhead is brought to the time frame 130 of an appearance of the integrated product 80 selected by the user 20. Accordingly, the user's exploration of the integrated products 80 may bring the playhead 142 all over progress bar 140. To prevent disruption, the media player 60 captures and stores the video time frame 130 where the playback was paused. The media player 60 continues to store the timeframe if the user decides to browse additional static product images 120 or to switch over to the interactive screen state 200. Once the user 20 has completed reviewing the available product information, the media player 60 may display post-product playback options when the cursor 160 hovers over the video frame 150. Post-product playback options may include a "resume where you left off" button 174 that when activated by the user 20 resumes playback from the paused location. Post-product playback options may also include a "play from here" button 172 to start playback from the current location of the playhead 142. In other embodiments, additional post-product playback options may include bringing playback to another strategic location, such as, the beginning of video chapters, the next scene, the end of commercial break, etc. As noted, the user 20 may toggle between the interactive screen 200 and product scrollbar states 100. The toggling may be accomplished by, for example, clicking a player state control switch 176 on the media player 60 or a mouse right-click menu, by pressing a keyboard key, such as the tab key, etc.

As shown in FIG. 3, the interactive screen state 200 is designed to allow passive discovery of integrated products 80 by showing product information 240 in a product information area 230 when a cursor 160 hovers over a product hotspot 220 in the video frame 150. In some embodiments, the product hotspot 220 is the integrated product 80 itself, for example, where the integrated product 80 is a fashion dress, the product hotspot 220 may be defined as any area within the image of the dress in the video frame 150 of the video content 30. The user 20 may then hover anywhere within the image of the dress to view product information 240 in the product information area 230. If the user 20 hovers over another product hotspot 220, the product information area 230 may be updated with the correct product information 240. Clicking the product hotspot 220 will freeze the product information 240 in the product information area 230. The clicking event prevents the cursor 160 from triggering the product information area 230 to display product information 240 of other product hotspots 220 that the cursor 160 would otherwise encounter. This permits the user 20 to review the product information 240 displayed within the product information area 230. In order to reactivate normal product hotspot discovery, the cursor 160 must leave and return to the video frame 150. Where the product is a service, the product hotspot 220 may be a physical representation of the service; for example, the product hotspot 220 for medical services may be the image of a hospital in the video frame of the video content 30.

In an interactive screen state 200, product hotspots 220 may be provided within the image of the integrated products 80 within the video frame 150. Product hotspots 220 may be invisible to the user 20. When the user 20 hovers the cursor 160 over a product hotspot 220, the user may discover the hidden product hotspot 220 when the product information 240 related to the integrated product 80 is displayed in the product information area 230. In an embodiment, the product information 240 may be displayed in the same screen real estate at the bottom of the player used by the product scrollbar 110 in the product scrollbar state 100. Additionally, in some embodiments, a product name label may popup over the product hotspot 220 within the video frame 150 of the interactive screen state 200 when the cursor 160 hovers over the product hotspot 220. The product information area 230 may include a "view details" link 170 to access a popup window 400 (FIG. 4) with further product information.

Producers of video content 30 may create product hotspots 220 using an overlay editor to create product hotspot overlays in communication with the backend of the media server 40. Shapes in the form of a rectangle, ellipse, or static images can be added to video content 30 being edited in an overlay. The geometrical properties (position, size) of the overlay can be modified using the overlay editor or another editing tool. Each overlay may be mapped to a product ID of an integrated product 80 whose information resides in a database of the media server 40.

On the front-end, the overlay editor receives parameters via FlashVars. The overlay editor may call the server to load the video title, overlay data and all the projects/hotspots mappings that are associated with the video content 30 being edited. The overlay editor may request the product information from the user each time the user supplies a product id for a product hotspot 220 and may cache that information to send it on Save. The application may also cache all the new and changed product hotspots 220 for sending on Save. The overlay and mappings are saved into an XML file with the fully defined overlay (hotspots and products).

Integrated products 80 viewed by the user 20 may be saved to a wish list or purchased. For example, an add to wishlist link 280 may be provided to permit the user to add the integrated product 80 to a wishlist. Additionally, integrated products 80 may also be shared to social networking sites, such as Facebook, Pinterest, etc. Further, a main product category link 290 may be provided to permit the user 20 to view all integrated products 80 in a list sorted by category.

During playback in the interactive screen state 200, in some embodiments, integrated products 80 are only discoverable by hovering the cursor 160 over the integrated products 80. In these embodiments, a user 20 who is not manipulating the cursor 160 may then enjoy the video content 30 without being distracted by unwanted product information 240. In other embodiments, an unobtrusive prompt, such as a small icon, may be used as a static hotspot 260 to indicate the presence of integrated products 80 in the video content 30.

In the interactive screen state 200, the media player 60 may include automatic start and stop functionality for playback. For example, the media player 60 may include a "pause video on" playback mode such that playback pauses when the cursor 160 hovers over the video frame 150 and the product information area 230 and resumes playback when the cursor 160 leaves the video frame 150. The "pause video on" playback mode gives the user 20 an opportunity to browse integrated products 80 without having to miss a moment of the video content 30. In an embodiment, the user 20 may enable the "pause video on" playback mode by clicking the interactive settings button 148 and clicking the appropriate checkbox in the interactive settings menu.

Figure 4:
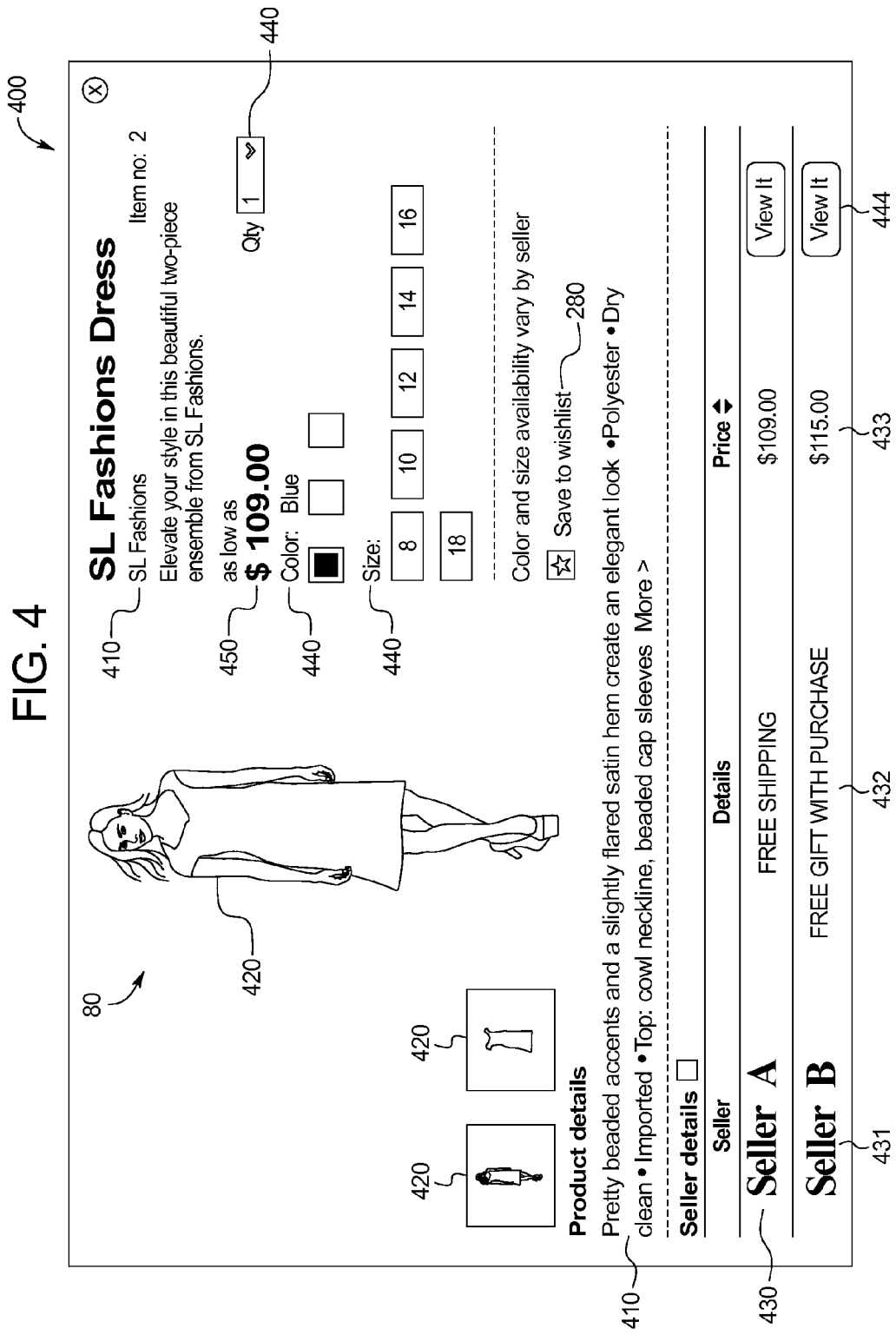
FIG. 4 illustrates a popup window of the media player user interface for presenting detailed product information.

As shown in FIG. 4, detailed product information of an integrated product 80 may appear in a popup window 400 when the user 20 clicks a product details link 170. The popup window 400 may include a product description 410, additional product images 420, seller details 430, selectable product details 440, a price 450, etc. When the popup window 400 is displayed, the video content 30 is paused. The user 20 may click on thumbnails of the additional product images 420 to view larger images. Using the selectable product details 440, the user 20 may view the availability of variations of the integrated product 80, such as different colors, or different sizes. The additional product images 420 may be updated in response to various user selections of the selectable product details 440. For example, if the user 20 clicks 'blue,' the additional product images 420 may be updated to show a blue version of the integrated product 80. If the user 20 likes an integrated product 80, she may click the add to wish list link 280, or may choose a seller 431 and click a seller link 444 to go to the seller's webpage for checkout. For each seller 431, seller details 432 may be listed to indicate special offers, free shipping, availability, etc. Additionally, for each seller, a seller price 433 may be listed to permit comparison shopping.

Figure 5B:
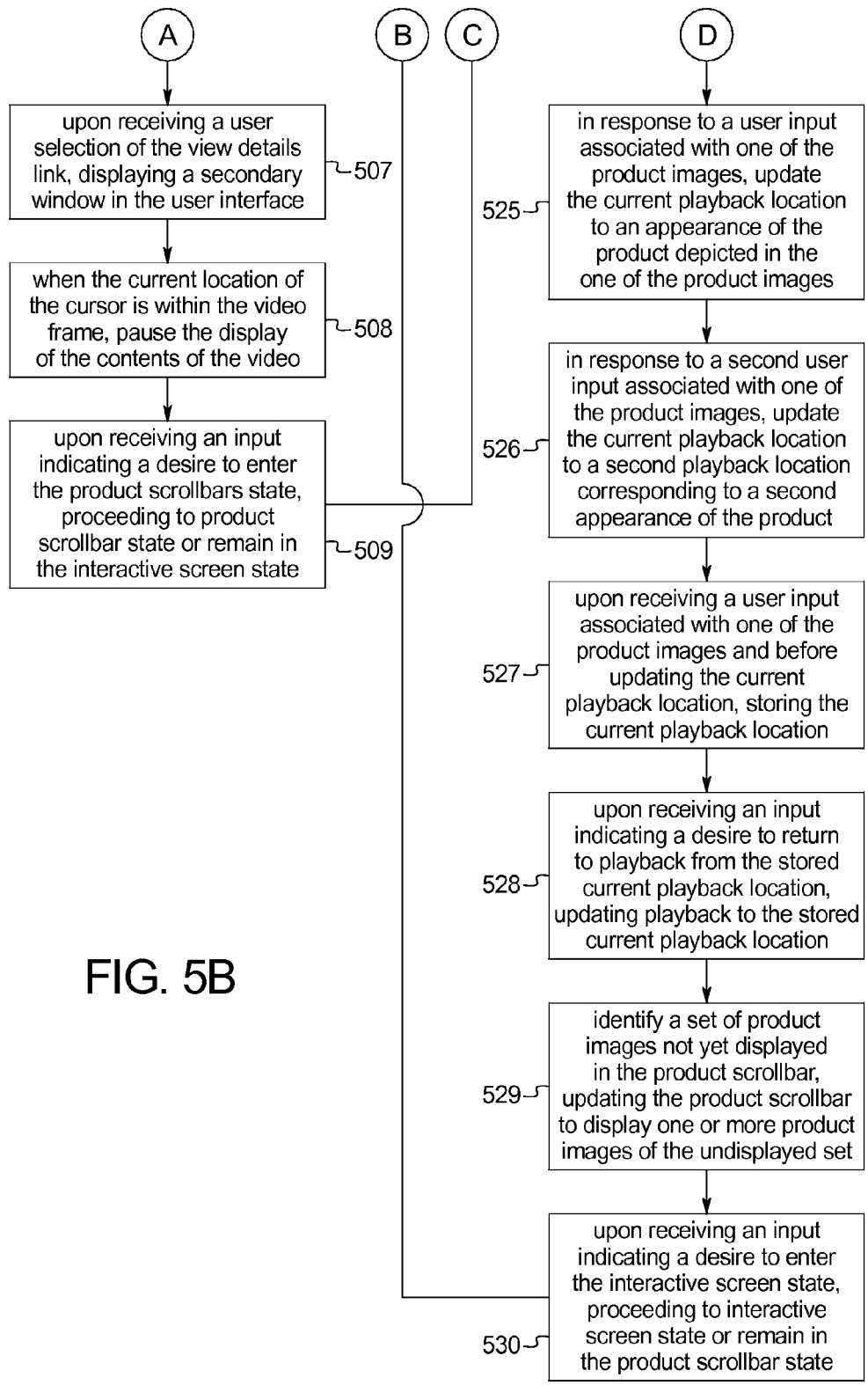

Turning to FIGS. 5a and 5b, a media player method 500 for execution by a computer is provided to provide a media player 60 of the current disclosure. As shown in FIGS. 5a and 5b, the method includes the steps of: at optional step 501, upon loading, if the media player 60 is in the product scrollbar state 100 proceed to step 520 or if the media player 60 is in the interactive screen state 200 proceed to step 502.

The sub-steps of the interactive screen state includes the steps of: at step 502, display a user interface 70 including a video frame 150 and a product information area 230, wherein the product information area 230 is adjacent or overlaps the video frame 150; at step 503, display the video content 30 in the video frame 150, wherein the video includes corresponding video metadata 90; at step 504, receive a current location of a cursor 160; at step 505, when the current location of the cursor 160 is within a product hotspot 220, display product information 240 associated with the product hotspot 220 in the product information area 230, wherein the product hotspot 220 is defined by the video metadata 90 as a location within the video frame 150, at one or more points in time, that is associated with the product information 240; at step 506, when the current location of the cursor 160 is within a product hotspot 220, further display a view details link; at step 507, upon receiving a user selection of the view details link, displaying a secondary window in the user interface 70, wherein the secondary window may include an image associated with the product, a product name, and a product description, and, in some embodiments, one or more links to a product page associated with the product on a retail web site; at step 508, when the current location of the cursor 160 is within the video frame 150 and/or the product information area 230, pause the display of the video contents 30; and at step 509, upon receiving an input indicating a desire to enter the product scrollbar state 100, proceeding to the product scrollbar state 100 at step 520.

The sub-steps of product scrollbar state includes the steps of: at step 520, display a user interface 70 including a video frame 150 and a product information area 230, display a product scrollbar 110 in the product information area 230, wherein the user interface 70 includes a product scrollbar 110 in the product information area 230; at step 521, display video contents 30 in the video frame 150, wherein the video includes corresponding video metadata 90; at step 522, when the current location of the cursor 160 is within a product image 120 of the product scrollbar 110, highlight the product image 120 and a time period on the progress bar 140; at step 523, when the current location of the cursor 160 is within a product image 120, further display a view details link; at step 524, upon receiving a user selection of the view details link, displaying a secondary window in the user interface 70, wherein the secondary window (such as a popup window 400) may include an image associated with the product, a product name, and a product description, and one or more links to a product page associated with the product on a retail web site; at step 525, in response to a user input associated with one of the product images 120, update the current playback location to a playback location defined by the video metadata 90 as corresponding to an appearance of the product depicted in the one of the product images 120; at step 526, in response to a second user input associated with one of the product images 120, update the current playback location to a second playback location defined by the video metadata 90 as corresponding to a second appearance of the product depicted in the one of the product images 120; at step 527, upon receiving a user input associated with one of the product images 120 and before updating the current playback location, storing the current playback location; at step 528, upon receiving an input indicating a desire to return to playback from the stored current playback location, updating playback to the stored current playback location; at step 529, identify a set of product images 120 not yet displayed in the product scrollbar 110, updating the product scrollbar 110 to display one or more product images 120 of the undisplayed set; and, at step 530, upon receiving an input indicating a desire to enter the interactive screen state 200, proceeding to the interactive screen state 200 at step 502.

FIG. 6 illustrates the logical components of the media player system 10. The media player 10 may include a controller 510, a memory 520, a network interface 530, and a user interface 540, among other components. The flash video application 65 may be stored in the memory 520.

Aspects of the systems and methods described herein are controlled by one or more controllers 510. The one or more controllers 510 may be adapted run a variety of application programs, access and store data, including accessing and storing data in associated databases, and enable one or more interactions via the device 10. Typically, the one or more controllers 510 are implemented by one or more programmable data processing devices. The hardware elements, operating systems, and programming languages of such devices are conventional in nature, and it is presumed that those skilled in the art are adequately familiar therewith.

For example, the one or more controllers 510 may be a PC based implementation of a central control processing system utilizing a central processing unit (CPU), memories 520 and an interconnect bus. The CPU may contain a single microprocessor, or it may contain a plurality of microprocessors for configuring the CPU as a multi-processor system. The memories 520 include a main memory 520, such as a dynamic random access memory (DRAM) and cache, as well as a read only memory 520, such as a PROM, EPROM, FLASH-EPROM, or the like. The system may also include any form of volatile or non-volatile memory 520. In operation, the main memory 520 stores at least portions of instructions for execution by the CPU and data for processing in accord with the executed instructions.

The one or more controllers 520 may also include one or more input/output interfaces for communications with one or more processing systems. The one or more such interfaces may include a network interface 530 to enable communications via a network, e.g., to enable sending and receiving instructions electronically. The communication links may be wired or wireless.

The one or more controllers 510 may further include appropriate input/output ports for interconnection with one or more output displays (e.g., monitors, printers, touchscreen, motion-sensing input device, etc.) and one or more input mechanisms (e.g., keyboard, mouse, voice, touch, bioelectric devices, magnetic reader, RFID reader, barcode reader, touchscreen, motion-sensing input device, etc.) serving as one or more user interfaces for the controller 510. For example, the one or more controllers 510 may include a graphics subsystem to drive the output display. The links of the peripherals to the system may be wired connections or use wireless communications.

Although summarized above as a PC-type implementation, those skilled in the art will recognize that the one or more controllers 510 also encompasses systems such as host computers, servers, workstations, network terminals, and the like. Further one or more controllers may be embodied in a mobile device, such as a mobile electronic device, like a smartphone or tablet computer. In fact, the use of the term controller 510 is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A media player system for product placements, comprising:
   a controller;
   a computer-readable non-transitory memory in communication with the controller including instructions that when executed by the controller cause it to:
   display a user interface including a video frame and a product information area, wherein the product information area is adjacent or overlaps the video frame;
   display contents of a video in the video frame, wherein the video includes corresponding video metadata;
   receive a current location of a cursor;
   when the current location of the cursor is within a first product hotspot, display first product information associated with the first product hotspot in the product information area, wherein the first product hotspot is defined by the video metadata as a location within the video frame, at one or more points in time, that is associated with the product information;
   when the current location of the cursor is within a first product hotspot, detect a click input;
   in response to detecting the click input, after the cursor leaves the first product hotspot and while the cursor remains within the video frame, when the current location of the cursor is within a second hotspot, continue to display the first product information.

2. The media player system of claim 1, wherein the product information includes an image associated with the product, a product name, and a product description.

3. The media player system of claim 1, wherein the memory further includes instructions that when executed by the controller cause it to:
   when the current location of the cursor is within the product hotspot, further display a view details link; and
   upon receiving a user selection of the view details link, display a secondary window in the user interface, wherein the secondary window includes an image associated with the product, a product name, and a product description.

4. The media player system of claim 1, wherein the memory further includes instructions that when executed by the controller cause it to:
   when the current location of the cursor is within the video frame, pause the display of the contents of the video.

5. The media player system of claim 1, wherein the memory further includes instructions that when executed by the controller cause it to:
   receive an input indicating a desire to enter a second user interface state, and
   when the system is in the second user interface state, display a product scrollbar in the product information area, wherein the product scrollbar includes one or more product images specified by the video metadata.

6. The media player system of claim 5, wherein the user interface includes a progress bar and the memory further includes instructions that when executed by the controller cause it to:
   when the current location of the cursor is within a product image of the product scrollbar, highlight the product image and highlight a time period on the progress bar.

7. The media player system of claim 6, wherein the memory further includes instructions that when executed by the controller cause it to:
   when the current location of the cursor is within the product image, further display a view details link; and
   upon receiving a user selection of the view details link, display a secondary window in the user interface, wherein the secondary window includes an image associated with the product, a product name, and a product description.

8. The media player system of claim 5, wherein the memory further includes instructions that when executed by the controller cause it to:
   in response to a user input associated with one of the product images, update a current playback location to a playback location defined by the video metadata as corresponding to an appearance of a product depicted in the one of the product images.

9. The media player system of claim 8, wherein the memory further includes instructions that when executed by the controller cause it to:
   in response to a second user input associated with the one of the product images, update the current playback location to a second playback location defined by the video metadata as corresponding to a second appearance of the product depicted in the one of the product images.

10. The media player system of claim 8, wherein the memory further includes instructions that when executed by the controller cause it to:
    upon receiving the user input associated with the one of the product images and before updating the current playback location, store the current playback location; and
    upon receiving an input indicating a desire to return to playback from the stored current playback location, update playback to the stored current playback location.

11. The media player system of claim 8, wherein the memory further includes instructions that when executed by the controller cause it to:
    identify an undisplayed set of product images not yet displayed in the product scrollbar;
    calculate a display time based on a remaining playtime of the contents of the video and a number of subsets of the undisplayed set of product images;
    during playback, periodically update the product scrollbar to display one of the subsets of the undisplayed set of product images, wherein the period of updating is equal to the display time.

12. A media player method for product placements for execution by a controller, comprising:
    display, by the controller, a user interface including a video frame and a product information area, wherein the product information area is adjacent or overlaps the video frame;
    display, by the controller, contents of a video in the video frame of the user interface, wherein the video includes corresponding video metadata;
    receive, by the controller, a current location of a cursor; and
    when the current location of the cursor is within a first product hotspot, display, by the controller, product information associated with the first product hotspot in the product information area, wherein the first product hotspot is defined by the video metadata as a location within the video frame, at one or more points in time, that is associated with the product information;
    when the current location of the cursor is within a first product hotspot, detect a click input;
    in response to detecting the click input, after the cursor leaves the first product hotspot and while the cursor remains within the video frame, when the current location of the cursor is within a second hotspot, continue to display the first product information.

13. The media player method of claim 12, wherein the product information includes an image associated with the product, a product name, and a product description.

14. The media player method of claim 12, further comprising:
when the current location of the cursor is within the product hotspot, further display, by the controller, a view details link; and
upon receiving a user selection of the view details link, display, by the controller, a secondary window in the user interface, wherein the secondary window includes an image associated with the product, a product name, and a product description.

15. The media player method of claim 12, further comprising:
when the current location of the cursor is within the video frame, pause, by the controller, the display of the contents of the video.

16. The media player method of claim 12, further comprising:
receive, by the controller, an input indicating a desire to enter a second user interface state, and
when the system is in the second user interface state, display on the user interface, by the controller, a product scrollbar in the product information area, wherein the product scrollbar includes one or more product images specified by the video metadata.

17. The media player method of claim 16, further comprising:
when the current location of the cursor is within a product image of the product scrollbar, highlight, by the controller, the product image and highlight a time period on the progress bar.

18. The media player method of claim 16, further comprising:
in response to a user input associated with one of the product images, update the current playback location to a playback location defined by the video metadata as corresponding to an appearance of the product depicted in the one of the product images.

19. The media player method of claim 18, further comprising:
in response to a second user input associated with the one of the product images, update the current playback location to a second playback location defined by the video metadata as corresponding to a second appearance of the product depicted in the one of the product images.

20. A media player system for product placements comprising:
a controller;
a computer-readable non-transitory memory in communication with the controller including instructions that when executed by the controller cause it to:
display a user interface including a video frame and a product information area, wherein the product information area is adjacent or overlaps the video frame;
display contents of a video in the video frame, wherein the video includes corresponding video metadata, wherein the video frame is in a first state;
receive a current location of a cursor;
when the current location of the cursor is within a first product hotspot when the video frame is in the first state, display first product information associated with the first product hotspot in the product information area, wherein the first product hotspot is defined by the video metadata as a location within the video frame, at one or more points in time, that is associated with the product information;
when the current location of the cursor is within a second product hotspot when the video frame is in the first state, display second product information associated with the second product hotspot in the product information area;
when the current location of the cursor is within the second product hotspot and the second product information is displayed in the product information area, detect a click input;
in response to detecting the click input, updating the video frame to a second state;
while in the second state, when the current location of the cursor is within the first product hotspot, continue displaying the second product information in the product information area;
after detecting the click input, in response to detecting the cursor outside the video frame, updating the video frame to the first state.

* * * * *